(12) United States Patent
Cyuzawa (10) Patent No.: US 9,048,680 B2
(45) Date of Patent: Jun. 2, 2015

(54) ELECTRICITY DISTRIBUTION SYSTEM

(75) Inventor: Takaaki Cyuzawa, Osaka (JP)

(73) Assignee: PANASONIC INTELLECTUAL PROPERTY MANAGEMENT CO., LTD., Osaka-shi (JP)

( * ) Notice: Subject to any disclaimer, the term of this patent is extended or adjusted under 35 U.S.C. 154(b) by 825 days.

(21) Appl. No.: 13/381,168

(22) PCT Filed: Jun. 21, 2010

(86) PCT No.: PCT/JP2010/060478
§ 371 (c)(1),
(2), (4) Date: May 9, 2012

(87) PCT Pub. No.: WO2011/001845
PCT Pub. Date: Jan. 6, 2011

(65) Prior Publication Data
US 2012/0212052 A1   Aug. 23, 2012

(30) Foreign Application Priority Data

Jun. 30, 2009   (JP) .................................. 2009-156111

(51) Int. Cl.
*H02J 1/00*   (2006.01)
*H02J 3/00*   (2006.01)
(Continued)

(52) U.S. Cl.
CPC ... *H02J 3/02* (2013.01); *H02H 7/26* (2013.01); *H02J 5/00* (2013.01)

(58) Field of Classification Search
CPC ................ H02J 5/00; H02J 1/00; H02J 3/00; H02H 7/26
USPC ........................................ 307/11, 18, 25, 26
See application file for complete search history.

(56) References Cited

U.S. PATENT DOCUMENTS

2002/0159214 A1*  10/2002  Perlick et al. .................. 361/160
2005/0099829 A1*   5/2005  Wei et al. ......................... 363/34
(Continued)

FOREIGN PATENT DOCUMENTS

JP         03-256520 A      11/1991
JP         2002-315197 A    10/2002
(Continued)

OTHER PUBLICATIONS

Zhang Li, "Application of single phase 3-line system and tri-phase 5-line system in constructed power supply circuit," Energy Saving of Non-Ferrous Metallurgy, vol. 21, No. 3, Jun. 30, 2004, pp. 32-34 and English translation thereof.
(Continued)

*Primary Examiner* — Rexford Barnie
*Assistant Examiner* — Elim Ortiz
(74) *Attorney, Agent, or Firm* — Locke Lord LLP (57) ABSTRACT

The invention provides an electricity distribution system, which can keep a voltage to ground low, and can commonly detect abnormity, such as an electrical leak etc. produced in AC and DC feed lines. An AC-DC converter 21 is installed between the AC feed line (branch electrical circuit Lb) of a single phase three wire system for supplying the power to AC devices 41, and the DC feed line (main electrical circuit Ld) of a three wire system for supplying the power to DC devices. The DC feed line comprises a neutral wire N commonly connected to a neutral wire N of the AC feed line within the AC-DC converter 21, a positive voltage wire L+ having a positive electrical potential to an electrical potential of its neutral wire N, and a negative voltage wire L− having a negative electrical potential to the electrical potential of its neutral wire N. A voltage of +150 [V] is applied to the positive voltage wire L+, and a voltage of −150 [V] is applied to the negative voltage wire L−.

4 Claims, 3 Drawing Sheets

(51) Int. Cl.
  *H02J 3/02* (2006.01)
  *H02J 5/00* (2006.01)
  *H02H 7/26* (2006.01)

(56) References Cited

U.S. PATENT DOCUMENTS

| | | | |
|---|---|---|---|
| 2005/0122075 A1* | 6/2005 | Ramirez et al. | 318/280 |
| 2005/0122747 A1* | 6/2005 | Gaksch | 363/24 |
| 2005/0281067 A1* | 12/2005 | Deng et al. | 363/131 |
| 2010/0172166 A1* | 7/2010 | Singh et al. | 363/131 |
| 2014/0169048 A1* | 6/2014 | Inoue et al. | 363/64 |

FOREIGN PATENT DOCUMENTS

| | | |
|---|---|---|
| JP | 2003-204682 A | 7/2003 |
| JP | 2008-042999 A | 2/2008 |
| JP | 2008-104334 A | 5/2008 |

OTHER PUBLICATIONS

Office Action dated Aug. 30, 2013, issued for the corresponding Chinese patent application No. 201080029753.5 and English translation thereof.
International Search Report dated Sep. 14, 2010, issued for PCT/JP2010/060478.

* cited by examiner

ELECTRICITY DISTRIBUTION SYSTEM

TECHNICAL FIELD

The invention relates generally to electricity distribution systems and, more particularly, to an electricity distribution system, which comprises an AC feed line and a DC feed line.

BACKGROUND ART

In recent years, it has become popular to utilize a dispersed power source, which uses recyclable energy with a low impact on the environment, such as a solar power generation device and a wind energy conversion system. This kind of dispersed power source is configured so as to generate an AC power as the wind energy conversion system and a gas engine power generation device, or is configured so as to generate a DC power. Then, the power-generating capacity of the solar power generation device varies infinitely depending on fluctuation of amount of solar radiation. Therefore, it has been proposed to equalize a supply capability by means of combining the solar power generation device with an electrical power storage unit comprising a secondary battery.

Usually, the DC power generated in the dispersed power source, and the DC power outputted from the electrical power storage unit are converted into the AC power by using inverter equipment, and then the converted AC power is supplied to electrical devices, which are driven by the AC power. However, most of the electrical devices are configured to be driven by using an internal power circuit or an external wall adapter to convert the AC power into the DC power.

In the case where this kind of electrical devices are driven, the AC power is converted into the DC power by the internal power circuit or the external wall adapter after conversion of the DC power supplied from the dispersed power source and the electrical power storage unit into the AC power. Thus, the power loss increases with the power conversion, and the usage efficiency of the power decreases.

As a technology for solving this kind of problems, it has been proposed to use through a combination of the AC power supplied from a commercial power source and the DC power supplied from the dispersed power source and the electrical power storage unit in Japanese Patent Application Laid-Open No. 2002-315197 (hereinafter called "a document 1"). Then, an electricity distribution system is described in the document 1 and is provided with an AC feed line for supplying the AC power to a load and a DC feed line for supplying the DC power to a load.

By the way, the document 1 does not disclose the wiring configuration and the applied voltage to the electrical devices driven by the DC power ("DC load 12" described in the document 1). However, the document 1 discloses that when a supply voltage of the dispersed power source and the electrical power storage unit is within the range of 300 [V] to 345 [V], the system supplies the DC power supplied from the dispersed power source or the electrical power storage unit to a DC-DC converter ("DC/DC converter 18" described in the document 1). The DC-DC converter supplies the DC power to a DC load.

As described above, the configuration described in the document 1 requires the DC-DC converter for power conversion in order to supply the DC power to the electrical devices, and then the relatively-large power loss remains to be produced with the power conversion.

Then, the configuration described in the document 1 is provided with an AC-DC converter ("AC/DC converter 14 described in the document 1), for converting the AC power supplied from the commercial power source into the DC power, between the AC feed line and the DC feed line. It is considered that the output voltage of the AC-DC converter is set so as to roughly correspond to the output voltage of the dispersed power source or the electrical power storage unit. Therefore, for example, it is considered that the AC-DC converter outputs the DC voltage of about 300 [V].

On the other hand, it is preferred that a voltage to ground of each electrical circuit within a house is limited so as to be slightly higher than a maximum voltage of its electrical circuit. For instance, when the maximum voltage of each electrical circuit is 144 [V], the condition that the voltage to ground is less than or equal to 150 [V] is attached. Thus, the output voltage of the above-mentioned AC-DC converter can not satisfies this condition.

DISCLOSURE OF THE INVENTION

It is an object of the present invention to provide an electricity distribution system, which can decrease power loss associated with power conversion by means of giving consideration to the wiring configuration of an AC feed line and a DC feed line, and can keep a voltage to ground low, and can satisfy a condition for the voltage to ground within a house.

To achieve the above-mentioned object, an electricity distribution system of the present invention comprises an AC feed line of a single phase three wire system for supplying an AC power to electrical devices, a DC feed line of a three wire system for supplying a DC power to electrical devices, an AC-DC converter converting the AC power inputted from said AC feed line into the DC power outputted to said DC feed line. Then, said AC-DC converter comprises an electrical circuit commonly connecting one of three wires of said DC feed line and a neutral wire of said AC feed line. Then, said AC-DC converter is configured to apply a DC voltage to each of positive and negative voltage wires, and said positive voltage wire has a positive electrical potential to an electrical potential of said neutral wire, and said negative voltage wire has a negative electrical potential to the electrical potential of said neutral wire.

In this configuration of the present invention, the system is provided with an AC-DC converter between an AC feed line of a single phase three wire system and a DC feed line. Then, as a three wire system, the DC feed line comprises a neutral wire being commonly connected to a neutral wire of said AC feed line, and further comprises a positive voltage wire having a positive electrical potential to an electrical potential of said neutral wire of said AC feed line, and a negative voltage wire having a negative electrical potential to the electrical potential of said neutral wire of said AC feed line. Therefore, said DC feed line can be installed as an extension of said AC feed line of a single phase three wire system, and house wiring can be easily performed.

Then, preferably, electrical devices receiving the AC power from said AC feed line and electrical devices receiving the DC power from said DC feed line are commonly connected to ground.

In addition to the above-mentioned configuration, the electricity distribution system comprises a leak detector connected to said DC feed line. Then, said leak detector comprises a series circuit of first and second resistors, a series circuit of third and fourth resistors, a series circuit of fifth and sixth resistors, a seventh resistor, a first diode, a second diode and a detection control circuit. Both ends of said series circuit of first and second resistors are connected to said positive voltage wire and said negative voltage wire through first and second switches, respectively. One end of said series circuit of third and fourth resistors is connected to said positive voltage wire through a third switch, and the other end is connected to said negative voltage wire. One end of said series circuit of fifth and sixth resistors is connected to said positive voltage wire, and the other end is connected to said negative voltage wire through a fourth switch. One end of said seventh resistor is connected to a connecting point of said first and second resistors. A cathode of said first diode is connected to a connecting point of said third and fourth resistors, and an anode of said first diode is connected to the other end of said seventh resistor. An anode of said second diode is connected to a connecting point of said fifth and sixth resistors, and a cathode of said second diode is connected to the other end of said seventh resistor. Then, said detection control circuit is configured to control each switch, and to determine the presence or absence of an electrical leak based on electrical potential relationships between a first detection point being a connecting point of said first and second resistors, a second detection point being a connecting point of said first and second diodes, a third detection point being a connecting point of said third and fourth resistors, and a fourth detection point being a connecting point of said fifth and sixth resistors, and to interrupt said DC feed line upon detection of the electrical leak. Then, resistance values of said first and second resistors are set to be equal to each other, and resistance values of said third and sixth resistors are set to be less than resistance values of said first and second resistors, and resistance values of said fourth and fifth resistors are set to be more than resistance values of said first and second resistors.

In this configuration, the system further comprises a fifth switch for selecting either one of a first state where said first detection point is connected to ground, and a second state where said first detection point is not connected to ground. Then, preferably, said detection control circuit is configured to detect an electrical leak of said DC feed line when said fifth switch selects said first state. Then, said detection control circuit is configured to detect the presence of neutral wire phase interruption by means of comparing an electrical potential of said first detection point with an electrical potential of said neutral wire when said fifth switch selects said second state.

In addition, for electrical devices comprising a rectification circuit and a switching power circuit, said AC-DC converter is configured so that absolute values of voltages applied to said positive and negative voltage wires are set to be equal to each other, and to be within the range of a voltage being able to be used as an input voltage for said switching power circuit.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 3:
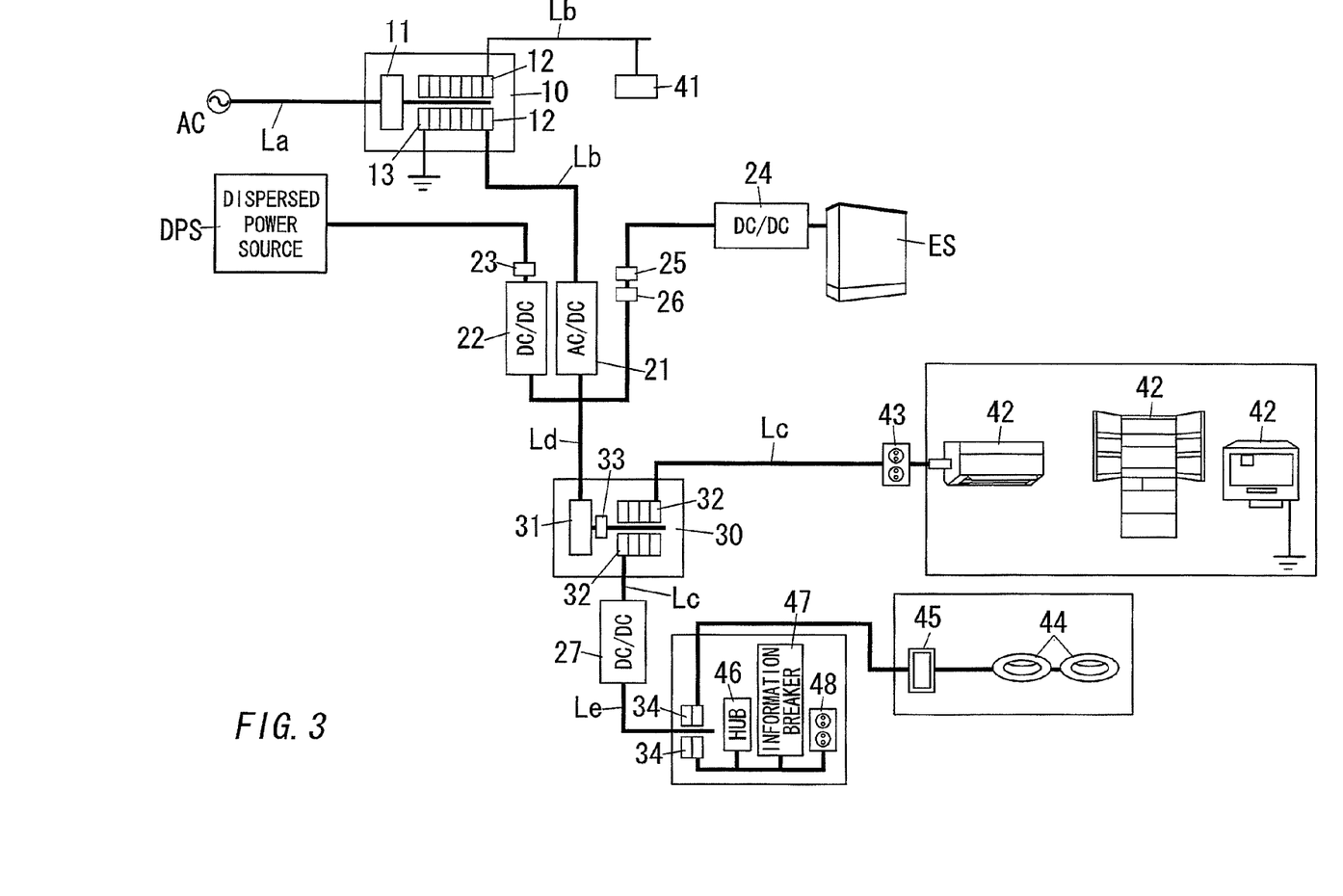
FIG. 3 is a wiring diagram showing a configuration example of an electricity distribution system using said essential part according to said embodiment.

First, the whole configuration of a distribution system is explained referring to FIG. 3. Here, the distribution system is explained through using a detached house, as one example of a building. However, the same technology can be adopted even in the case where the building is a multiple dwelling house. Then, an electricity distribution system shown in the figure comprises an AC feed line and a DC feed line, and is configured so that the AC feed line receives an AC power from only a commercial power source AC. However, when a dispersed power source DPS comprises a solar power generation facility, the system can be also configured so that the power generated in the solar power generation facility is used for the AC power supplied to the AC feed line.

It is assumed that the commercial power source AC supplies the AC power through a single phase three wire system. Also, the commercial power source AC is explained in the case that a line voltage between its both voltage wires is 200 [V] and a line voltage between its neutral wire and each of its both voltage wires is 100 [V]. That is, the commercial power source AC of a single phase three wire system of 100V/200V is explained as an example. However, another voltage, such as a single phase three wire system of 120V/240V, may be adopted to the commercial power source AC described below.

In the example shown in the figure, the commercial power source AC is connected to a main breaker 11 located in a distribution board 10 through a main electrical circuit La in the AC feed line. Then, the main electrical circuit La branches into a plurality of branch electrical circuits Lb through a plurality of branch breakers 12 located in the distribution board 10. The plurality of branch electrical circuits Lb supply an AC 100 [V] or an AC 200 [V] to electrical devices 41 (hereinafter called "AC devices"), such as a lighting apparatus, an audio visual system, an induction cooker, a washing machine, a vacuum cleaner, and a water heater, which are driven by the AC power.

In addition to the main breaker 11 and the plurality of branch breakers 12, the distribution board 10 is provided with a surge protective device (SPD) 13 having a protective effect against a lightning surge. Any one of the branch breakers 12 in the distribution board 10 supplies the power to an AC-DC converter 21. Then, the power is supplied to the AC devices 41 through a single phase two wire, and also the power is supplied to the AC-DC converter 21 through a single phase three wire.

Thus, a cable of a three wire system is used for the branch electrical circuit Lb connected to the AC-DC converter 21. In addition, a breaker with 3-pole contact is used as the branch breaker 12 installed between the AC-DC converter 21 and the main breaker 11. Or two branch breakers 12 are used for supplying the power to the AC-DC converter 21. In this case, the used two branch breakers 12 are connected to different voltage wires in the AC feed line La, respectively, and are commonly connected to a neutral wire in the AC feed line La, and thereby are connected to the above cable of the three wire system.

Then, a DC output port of the AC-DC converter 21 is connected to a main electrical circuit Ld in the DC feed line. Then, the main electrical circuit Ld in the DC feed line is connected to a DC output port of a DC-DC converter 22 to which the power generated in the dispersed power source DPS is inputted as an input power. For example, a solar power generation facility or a fuel cell system module is used as the dispersed power source DPS. A switch 23 is installed between the dispersed power source DPS and the DC-DC converter 22, and then interrupts an electrical circuit between the dispersed power source DPS and the DC-DC converter 22 when an output voltage of the dispersed power source DPS is reduced or the dispersed power source DPS is abnormal in operation.

Then, a bi-directional DC-DC converter 24 is connected to the main electrical circuit Ld through a switch 25 and a protective circuit 26. The bi-directional DC-DC converter 24 is connected to an electrical power storage unit ES comprising a secondary battery, such as a lithium ion battery. The bi-directional DC-DC converter 24 is configured to control to charge the electrical power storage unit ES with the DC power from the main electrical circuit Ld and to control to discharge the DC power from the electrical power storage unit ES through the main electrical circuit Ld. The switch 25 opens and closes a connection between the electrical power storage unit ES and the main electrical circuit Ld, and the protective circuit 26 protects the unit ES and the circuit Ld.

For the above-mentioned configuration, the AC-DC converter 21, the DC-DC converter 22 and the bi-directional DC-DC converter 24 can supply the DC power to the main electrical circuit Ld in the DC feed line. As described above, the AC-DC converter 21 converts the AC power supplied from the commercial power source AC through the single phase three wire system into the DC power. Also, the DC-DC converter 22 controls the DC power supplied from the dispersed power source DPS. Furthermore, the bi-directional DC-DC converter 24 controls to charge with the DC power and to discharge the DC power.

By the way, in the present embodiment, in view of the fact that the AC power is supplied to the AC-DC converter 21 through the single phase three wire system, the main electrical circuit Ld, installed in the output side of the AC-DC converter 21, is also wired through a three wire system. The three wires constituting the main electrical circuit Ld are described below.

The main electrical circuit Ld in the DC feed line is connected to a DC main breaker 31 installed in a DC distribution board 30. Then, a plurality of DC branch breakers 32 are connected to the DC main breaker 31 through a leak detector 33. A branch electrical circuit Lc is connected to each DC branch breaker 32. In other words, in addition to the DC main breaker 31, the leak detector 33 and the DC branch breakers 32 are housed in the DC distribution board 30

In the present embodiment, any one of voltages of +150 [V], −150 [V] and 300 [V] can be selected as a line voltage in the branch electrical circuit Lc. These voltages are set so as to be slightly higher than a maximum value of a line voltage in the AC feed line. That is, as described below, the main electrical circuit Ld of a three wire system in the DC feed line comprises a neutral wire N with a reference electrical potential, a positive voltage wire L+ which has an electrical potential of +150 [V] to the neutral wire N, and a negative voltage wire L− which has an electrical potential of −150 [V] to the neutral wire N (see FIG. 1). Then, the line voltage of the branch electrical circuit Lc can be selected depending on any two wires, connected to the DC branch breaker 32, of these three wires.

Specifically, the line voltage of the branch electrical circuit Lc is set to +150 [V] by means of selecting the neutral wire N and the positive voltage wire L+. Then, the line voltage is set to −150 [V] by means of selecting the neutral wire N and the negative voltage wire L−. Furthermore, the line voltage is set to 300 [V] by means of selecting the positive voltage wire L+ and the negative voltage wire L−. Therefore, if the branch electrical circuit Lc has a maximum allowable working current of 30 [A], the system can supply a maximum electrical power of 9 [kW] to a load.

Thereby, the system can keep an electrical power, which is enough to be able to drive not only an electrical device of a low load, such as a lighting apparatus, but also electrical devices 42 of high loads, such as an air conditioner, a refrigerator, a microwave and a washing machine. That is, a high voltage can be applied to the electrical devices 42 driven by the DC power. Thus, as the electrical devices 42 driven by the DC power, it can be used high loads which have the same level of load as electrical devices driven by the AC power.

By the way, these electrical devices 42 are nearly-constantly connected to the branch electrical circuit Lc. Then, a dedicated DC outlet 43 is used for connection of these electrical devices 42, and thereby the arc generation can be prevented when a plug is connected to or disconnected from the DC outlet 43. In addition, electrical devices 42, such as an iron and a vacuum cleaner, are connected to the branch electrical circuit Lc only when used. As a result, a unique DC outlet is used for connection of such electrical devices 42, and thereby the electric conduction generation can be prevented when a plug is connected to or disconnected from the DC outlet. In addition, preferably, a chopper circuit of a polarity reversing type is used as the AC-DC converter 21 in order to set the line voltage of the DC feed line as described above.

Then, a DC-DC converter 27 for step down is connected to the branch electrical circuit Lc, which is connected to some breakers of the plurality of DC branch breakers 32, and has an isolation transformer built in. For example, as an output voltage of the DC-DC converter 27, any one of voltages of 5 [V], 12 [V], 24 [V] and 48 [V] can be selected. In the example shown in the figure, only one DC-DC converter 27 is installed. However, the system may require a plurality of DC-DC converters 27 of which the number is more than or equal to the number of the above output voltages. Then, electrical devices of low loads are connected to the output side of the DC-DC converter 27 through DC circuit breakers 34.

As the electrical devices of low loads, a lighting apparatus 44 and a wall switch 45 are shown in the example of the figure, and the wall switch 45 controls the lighting-up of the lighting apparatus 44. Also, as the electrical devices of low loads, a hub 46, an information breaker 47 and a DC outlet 48 are shown in the example of the figure, and the hub 46 concentrates lines of communication devices, and the information breaker 47 is installed as a router in the border between an internal communications network and an external communications network, such as a public network. The DC outlet 48 is installed for connecting the electrical devices of low loads. As the electrical devices of low loads, devices other than the above communication devices can be also used. Furthermore, it can be used a variety of electrical devices driven by the DC power, such as a phone, a personal computer, a flat panel television set, a video recorder, a ventilator and a foot light.

As described above, not each of the electrical devices but the AC-DC converter 21 converts the AC power into the DC power collectively. Thus, the system can decrease power loss associated with power conversion.

Then, the main electrical circuit Ld and the branch electrical circuit Lc in the DC feed line may have a function as a communication path in addition to a function for supplying the DC power, and thereby the devices may be configured to operate in concert with each other. In this case, a communication signal, for transmitting a data by using a high-frequency carrier wave, is superimposed with the DC voltage, and thereby the system enables communication between units and devices connected to the DC feed line. This technology is similar to a power line carrier technology that a communication signal is superimposed with the AC voltage in an electrical power line for supplying the AC power.

Figure 1:
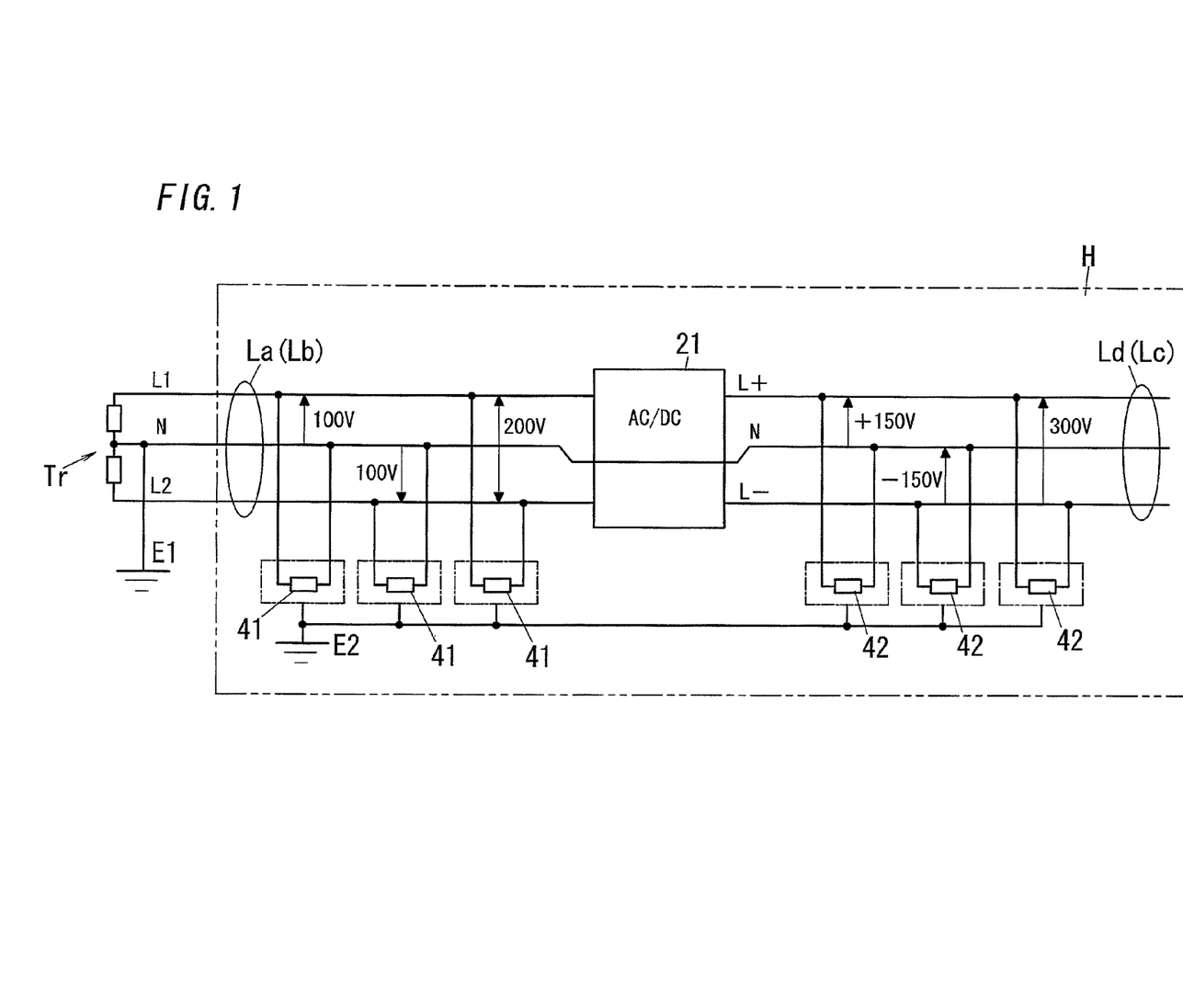
FIG. 1 is a wiring diagram showing an essential part according to an embodiment.

The configuration of an essential part is explained below. The configuration example shown in FIG. 1 shows a peripheral circuit of the AC-DC converter 21 shown in FIG. 3, and the AC-side and DC-side of the peripheral circuit are simplified in FIG. 1. In the configuration example in FIG. 1, the distribution board 10, the dispersed power source DPS and the DC distribution board 30 etc. are omitted, and then the AC devices 41 and electrical devices 42 of high loads (hereinafter called "DC devices") are shown. Then, a pole transformer Tr is shown as the commercial power source AC.

The main electrical circuit La of the single phase three wire system in the AC feed line is wired from the commercial power source AC (that is, the pole transformer Tr) into a house H. Then, the power is supplied to the AC devices 41 through the distribution board 10 (see FIG. 3). The main electrical circuit La comprises one neutral wire N and two voltage wires L1, L2. In the pole transformer Tr, the neutral wire N is connected to the earth ground E1 (for example, B-class grounding).

The main electrical circuit La wired into the house applies a line voltage (100 [V]) between the neutral wire N and each of the voltage wires L1, L2 to the AC devices 41, and applies a line voltage (200 [V]) between the voltage wires L1, L2 to the AC devices 41. Therefore, the main electrical circuit La can supply the power to both of 100 [V] AC devices 41 and 200 [V] AC devices 41.

The AC-DC converter 21 is connected to the main electrical circuit La, and then the AC-DC converter 21 converts AC powers supplied through the neutral wire N and the voltage wire L1, L2 into positive and negative DC powers with respect to an electrical potential of the neutral wire N. Thus, the AC-DC converter 21 specifically comprises positive and negative AC-DC converters.

In the example shown in the figure, the AC-DC converter 21 converts an AC voltage of 100 [V] supplied through the neutral wire N and the voltage wire L1 into a positive DC voltage (+150 [V]) with respect to the neutral wire N. Then, the AC-DC converter 21 converts an AC voltage of 100 [V] supplied through the neutral wire N and the voltage wire L2 into a negative DC voltage (−150 [V]) with respect to the neutral wire N. The DC voltage outputted from the AC-DC converter 21 is set so as to be slightly higher than a voltage (that is, a voltage about equal to a maximum value of the AC voltage), obtained by means of rectifying the AC voltage to a full wave and smoothing the full wave rectified voltage.

Therefore, the main electrical circuit Ld in the DC feed line comprises the neutral wire N, the positive voltage wire L+ to which the positive voltage is applied and the negative voltage wire L− to which the negative voltage is applied, as the three wire system. The neutral wire N of the main electrical circuit Ld in the DC feed line is connected to the neutral wire N of the main electrical circuit La in the AC feed line, and then these neutral wires N are not insulated from each other. That is, the neutral wire N of the main electrical circuit Ld in the DC feed line is connected to the earth ground E1 in the pole transformer Tr. In addition, the AC devices 41 and the DC devices 42 are also connected to the earth ground E2 (for example, D-class grounding).

By the way, the voltage outputted from the AC-DC converter 21 is set so as to be slightly higher than the maximum value of the AC voltage for the following reason.

Recently, there is an increased number of the AC devices 41 with built-in inverter circuits. Then, in addition to the lighting apparatus, an air conditioner, a refrigerator and a washing machine etc. also have inverter circuits built-in. Most of these inverter circuits are configured to provide in these fronts with rectification circuits for rectifying the AC power to a full wave and DC-DC converters (mostly chopper circuits) doubling as circuits for power factor improvement. Then, it is also known the circuit configuration sharing switching elements of the inverter circuits and switching elements of the DC-DC converters.

That is, a power circuit for this kind of the AC devices 41 can be formed in combination with a rectification circuit and a switching power circuit. Therefore, the voltage outputted from the AC-DC converter 21 is set to be about equal to a maximum value of an AC voltage, which is outputted from the rectification circuit. In other words, the voltage outputted from the AC-DC converter 21 is set within a range of voltage, which can be used as a voltage inputted to the switching power circuit.

For this reason, a 100 [V] AC device 41 with a built-in inverter circuit can be operated by means of applying a DC voltage of about 150 [V] as a voltage inputted to the DC-DC converter. Then, a 200 [V] AC device 41 with a built-in inverter circuit can be operated by means of applying a DC voltage of about 300 [V] as a voltage inputted to the DC-DC converter. That is, in the AC device 41 with a built-in inverter circuit, the main electrical circuit Ld is connected to an input port of the DC-DC converter, and thereby the AC device 41 can be operated.

Therefore, the conventional AC device 41 with a built-in inverter circuit can be used by not only an AC power source but also a DC power source, as long as its design is changed so that its input terminal is loaded in the input port of the DC-DC converter. Thus, the existing AC electrical device can be used as the electrical device receiving the power from the DC feed line.

That is, as described above, even in a transitional stage when installation of the main electrical circuit Ld treating a DC-voltage of a high-voltage (±150 [V]) becomes widely used in the house H, the conventional AC device 41 can be transited to the DC device 42 without large design change. In short, a universal dual-current device can be easily formed in simple remodeling of the existing AC electrical device, and thus increase in cost associated with the design change can be prevented. Therefore, increase in cost can be prevented when the AC device 41 is transited to the DC device 42. Then, after installation of the main electrical circuit Ld in the DC feed line habitually take root in the house H, a dedicated DC device 42 can be provided inexpensively by means of easy design change as removing the rectification circuit from the AC device 41 provided with the inverter circuit.

In addition, the above-mentioned main electrical circuit Ld in the DC feed line is configured so that its neutral wire N is commonly connected to a neutral wire N of the main electrical circuit La in the AC feed line of the single phase three wire system. Thus, the house wiring can be easily installed by means of extending and wiring the three wire used in the main electrical circuit La in the AC feed line. Furthermore, a DC voltage of ±150 [V] is applied with respect to the neutral wire N in the main electrical circuit Ld. Thus, a condition that a voltage to ground within a house is less than or equal to 150 [V] can be satisfied (In Japan, such a condition is identified in the guide book of electrical equipment).

Then, in the pole transformer Tr, connection of the neutral wire N and the earth ground can be intensively performed without reference to AC or DC. Furthermore, connection of the AC and DC devices 41, 42 and the earth ground can be also intensively performed commonly. That is, there is no need to install a grounding wire in the AC feed line and the DC feed line, individually, and thus the construction of the earth ground is simplified and the incorrect wiring can be reduced. Then, the management of the earth ground becomes easy, and the safety can be improved. In addition, measures to the phase interruption of the neutral wire N can be instituted commonly in the AC-side and the DC-side.

As described above, a neutral wire N having an electrical potential intermediate between the positive voltage wire L+ and the negative voltage wire L− is installed in the DC feed line, and then the neutral wire N is connected to a neutral wire N in the AC feed line of a single phase three wire system, and then these neutral wires in the AC and DC feed lines is connected to ground. Thus, a high-voltage between the positive and negative voltage wires L+, L− can be used in the DC feed line, and the voltage to ground becomes a relatively-low voltage between the neutral wire N and either the positive or negative voltage wires L+, L−. In other words, the condition that the voltage to ground in the DC feed line is less than or equal to 150 [V] can be satisfied, and the power can be supplied to the DC devices 42 of high loads.

By the way, in the present embodiment, the leak detector 33 is installed between the DC main breaker 31 and the DC branch breakers 32 as shown in FIG. 3. Here, a variety of technologies to detect a DC electrical leak are well known. For example, there are a technology to monitor current balance by using a resistance bridge circuit, a technology to use so-called a direct current transformer (a current detector comprising a cyclic core and a hall effect device), and a technology to detect the presence or absence of a leak of signal by using a zero-phase current transformer and a signal injector, which injects a signal of which a voltage changes periodically (an AC signal or a pulse signal) into an appropriate place in an electrical circuit.

The technology to use the resistance bridge circuit is configured so that a resistor is connected between wires, and thus has a problem that a leak current is generated constantly and the electrical power is needlessly consumed. Then, the technology to use the direct current transformer has a problem that the hall effect device has a susceptibility to a noise and is difficult to control. Then, the technology to use the combination of the zero-phase current transformer and the signal injector has a problem that a signal injected by the signal injector becomes a noise content, and further the configuration is complicated.

Figure 2:
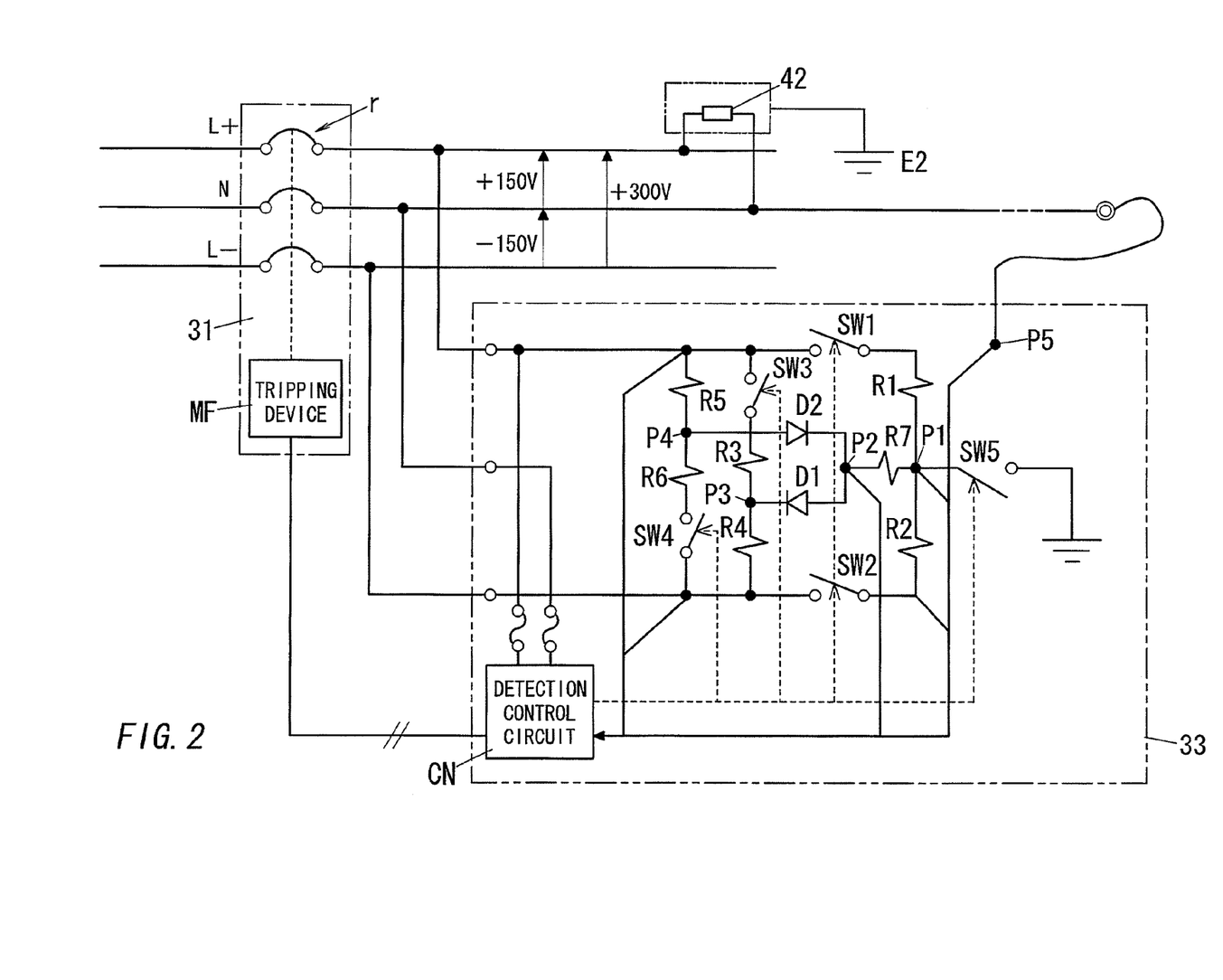
FIG. 2 is a circuit diagram showing a leak detector used in said essential part according to said embodiment.

So, as shown in FIG. 2, in the present embodiment, a switch is installed so that a current does not flow in the resistor except at the time of need, while using the resistance bridge circuit, and thereby the problem that the power is needlessly consumed due to the leak current can be prevented. The adoption of this configuration can provide a leak detector having a simple structure and a resistance to a noise.

The leak detector 33 shown in FIG. 2 can detect the following four kinds of abnormities. That is, the leak detector 33 can detect an electrical leak generated in the main electrical circuit Ld in the DC feed line (hereinafter, called "leakage measurement"), an electrical leak generated in an electrical circuit including the positive voltage wire L+ and the neutral wire N (hereinafter, called "leakage detection in plus-side"), an electrical leak generated in an electrical circuit including the negative voltage wire L+ and the neutral wire N (hereinafter, called "leakage detection in minus-side"), and the phase interruption of the neutral wire N (hereinafter, called "neutral wire phase interruption detection"). Then, the DC main breaker 31 comprises a tripping device MF, which forcibly opens a junction point "r" when receiving a tripping signal from an external, and is configured to output the tripping signal to the DC main breaker 31 when the leak detector 33 detect the abnormities. Then, in the example shown in the figure, only the DC main breaker 31 is controlled through the tripping signal. However, make and break of the main breaker 11 may be also controlled.

Specifically, the leak detector 33 comprises seven resistors R1 to R7, five switches SW1 to SW5, and two diodes D1, D2. One ends of the resistors R1, R2 are connected to each other, and the other end of the resistor R1 is connected to the positive voltage wire L+ through the switch SW1, and the other end of the resistor R2 is connected to the negative voltage wire L− through the switch SW2. Then, one ends of the resistors R3, R4 are connected to each other, and the other end of the resistor R3 is connected to the positive voltage wire L+ through the switch SW3, and the other end of the resistor R4 is connected to the negative voltage wire L−. Furthermore, one ends of the resistors R5, R6 are connected to each other, and the other end of the resistor R5 is connected to the positive voltage wire L+, and the other end of the resistor R6 is connected to the negative voltage wire L− through the switch SW4.

Then, one end of the resistor R7 is connected to a connection point of the resistors R1, R2, and the other of the resistor R7 is connected to a connection point of the resistors R3, R4 through the diode D1 and is connected to a connection point of the resistors R5, R6 through the diode D2. A cathode of the diode D1 is connected to the connection point of the resistors R3, R4, and an anode of the diode D2 is connected to the connection point of the resistors R5, R6. Then, either one of an on-state where the connection point of the resistors R1, R2 is connected to ground and an off-state can be selected through switching of the switch SW5.

Switching states of the switches SW1 to SW5 are controlled by a detection control circuit CN. Then, mechanical contacts, such as relays, or semiconductor switches may be used as the switches SW1 to SW3. Then, the detection control circuit CN monitors voltages in detection points P1 to P5, which are set in the leak detector 33, in accordance with the combination of on-off states of the switches SW1 to SW5, and then detects any one of the above-mentioned four kinds of abnormities. Then, in the example shown in the figure, the detection control circuit CN obtains the power through the positive voltage wire L+ and the neutral wire N. However, the detection control circuit CN may obtain the power through the negative voltage wire L− and the neutral wire N.

The detection point P1 is the connection point of the resistors R1, R2, and the detection point P2 is the connection point of the diodes D1, D2, and the detection point P3 is the connection point of the resistors R3, R4, and the detection point P4 is the connection point of the resistors R5, R6, and the detection point P5 is the connection point of the neutral wire N.

The following Table 1 shows a relationship between the kinds of the detected abnormities and the combination of on-off states of the switches SW1 to SW5. In addition, the switches SW1, SW2 are operated on/off in synchronization.

TABLE 1

| | | ABNORMITY | | | |
|---|---|---|---|---|---|
| SWITCH | NON-MEASUREMENT | LEAKAGE MEASUREMENT | LEAKAGE DETECTION IN PLUS-SIDE | LEAKAGE DETECTION IN MINUS-SIDE | NEUTRAL WIRE PHASE INTERRUPTION DETECTION |
| SW1, SW2 | OFF | ON | OFF | | ON |
| SW3 | OFF | ON | ON | OFF | OFF |
| SW4 | OFF | ON | OFF | ON | OFF |
| SW5 | — | ON | | ON | OFF |

Operation of the leak detector 33 is explained below. The relationships between the resistance values of the resistors R1 to R7 are represented by R1=R2, R3=R6=R1−ΔR, and R4=R5=R1+ΔR. Here, ΔR is accordingly set so as to be about several percent of R1 (for example, 0.01*R1<ΔR<0.05*R1). In addition, R7 is set so as to be less than ΔR (for example, 0.1*ΔR<R7<0.5*ΔR).

In the state where the leak detector 33 is set so as not to detect the abnormity, as shown in Table 1, the switches SW1 to SW4 are operated off, and it makes no difference if the switch SW5 is operated on or off. In this state, a current does not flow in each of the resistors R1 to R7, and thus the power is not consumed by the leak detector 33. That is, the resistors R1 to R7 can be disconnected from the DC feed line by using the switches SW1 to SW5, and thus the resistors R1 to R7 are not connected to the DC feed line except at the time of need. As a result, the current does not flow in each of the resistors R1 to R7 and the power loss is not also generated constantly, unlike the case where the resistors R1 to R7 are connected constantly. Then, the power loss, which is the defects of the leak detector of a resistor system, can be prevented.

Operation for detecting the abnormity is explained below. The switches SW1 to SW5 are on-operated in order to perform the "leakage measurement". That is, each of a series circuit of the resistors R1, R2, a series circuit of the resistors R3, R4 and a series circuit of the resistors R5, R6 is connected between the positive and negative voltage wires L+, L−, and then the detection point P1 is connected to ground.

Here, if a difference of electrical potential between the positive and negative voltage wires L+, L− is represented by V0, electrical potentials V1, V3, V4 are expressed as V1=V0*R2/(R1+R2), V3=V0*R4/(R3+R4), V4=V0*R6/(R5+R6), respectively. Then, because the resistance values of the resistors R1 to R6 are set as explained above, the relationship between these resistance values is expressed as R6/(R5+R6)<R2/(R1+R2)<R4/(R3+R4). Thus, when the system maintains a normal state where an electrical leak is not detected, the relationship between the potentials V1, V3, V4 in the detection points P1, P3, P4 is expressed as V4<V1<V3. At this time, a current does not flow in the diodes D1, D2, and thus a difference of electrical potential is not produced between both ends of the resistor R7, and the electrical potential V2 in the detection point P2 becomes equal to the electrical potential V1 in the detection point P1.

By the way, when ground fault is produced in the positive voltage wire L+, the potential V1 in the positive voltage wire L+ becomes about equal to the potential in the neutral wire N (that is, nearly 0 [V]). Therefore, if the potential in the negative voltage wire L− is represented by −E (=−150 [V]), the potential V3 in the detection point P3 can be expressed as V3=−E*R3/(R3+R4). Here, by reason of V3<0, the current flows along an electrical circuit connecting the detection points P1, P2, P3, in that order through the resistor R7 and the diode D1. That is, when the relationship between the potentials V1, V2, V3 in the detection points P1, P2, P3 is expressed as V1>V2>V3, the presence of ground fault can be determined.

Similarly, when ground fault is produced in the negative voltage wire L−, the current flows along an electrical circuit connecting the detection points P4, P2, P1, in that order. In this case, the relationship between the potentials V1, V2, V4 in the detection points P1, P2, P4 is expressed as V4>V2>V1.

Next, the switches SW1, SW2, SW4 are off-operated and the switches SW3, SW5 are on-operated in order to perform the "leakage detection in plus-side". That is, the resistors R1, R2, R6 have no connection, and one end of the resistor R7 is connected to ground. In this case, if ground fault is not produced in the positive voltage wire L+, the potential V3 in the detection point P3 is higher than the potential V2 (that is, nearly 0) in the detection point P2 (that is, V3>V2), and thus the current does not flow in the diode D1. Then, the potential V4 in the detection point P4 is lower than the potential in the detection point P2 (that is, V4<V2), and thus the current does not also flow in the diode D2. That is, the relationship between the potentials V1, V2 in the detection points P1, P2 is expressed as V1=V2.

On the other hand, if ground fault is produced in the positive voltage wire L+, the potential V3 in the detection point P3 has a negative potential with respect to the neutral wire N. Therefore, the current flow in the diode D1, and the relationship of V1>V2>V3 is obtained.

Similarly, the switches SW1, SW2, SW3 are off-operated and the switches SW4, SW5 are on-operated in order to perform the "leakage detection in minus-side". That is, the resistors R1, R2, R3 have no connection, and one end of the resistor R7 is connected to ground. In this case, if ground fault is not produced in the negative voltage wire L−, the potential V4 in the detection point P4 is lower than the potential V2 (that is, nearly 0) in the detection point P2 (that is, V4<V2), and thus the current does not flow in the diode D2. Then, the potential V3 in the detection point P3 is higher than the potential in the detection point P2 (V3>V2), and thus the current does not also flow in the diode D1. That is, the relationship between the potentials V1, V2 in the detection points P1, P2 is expressed as V1=V2.

On the other hand, if ground fault is produced in the negative voltage wire L−, the potential V4 in the detection point P4 has a positive potential with respect to the neutral wire N. Therefore, the current flows in the diode D2, and the relationship of V4>V2>V1 is obtained.

Then, the switches SW1, SW2 are on-operated and the switches SW3, SW4, SW5 are off-operated in order to perform the "neutral wire phase interruption detection". In this state, the resistors R3, R6 have no connection, and then when the potential in the positive voltage wire L+ is represented by +E and the potential in the negative voltage wire L− is represented by −E, the relationship between the potentials V1, V2 in the detection points P1, P2 is expressed as V1=V2=0. Then, if neutral wire phase interruption is not produced, the potential V5 in the detection point P5 is equal to the potential in the neutral wire N, and V5=0. That is, the relationship between the potentials is expressed as V1=V2=V5.

In contrast, when neutral wire phase interruption is produced or there is a large difference between load balances of the DC devices 42, which are connected to the positive and negative voltage wires L+, L−, respectively, the potential V5 in the neutral wire N is expressed as V5≠0. Thus, the relationship between the potentials is expressed as V1=V2≠V5.

To summarize determination in the detection control circuit CN, if the potentials V1 to V4 in the detection points P1 to P4 satisfy the relationship of V3<V1=V2<V4 in the "leakage measurement", the "leakage detection in plus-side" and the "leakage detection in minus-side", the absence of abnormity is determined.

Then, in the "leakage measurement", if the potentials satisfy the relationship of V3<V2<V1, the presence of ground fault in the positive voltage wire L+ is determined. Then, if the potentials satisfy the relationship of V1<V2<V4, the presence of ground fault in the negative voltage wire L− is determined. Furthermore, in the "leakage detection in plus-side", if the potentials satisfy the relationship of V3<V2<V1, the presence of ground fault in the positive voltage wire L+ is determined. Then, in the "leakage detection in minus-side", if the potentials satisfy the relationship of V1<V2<V4, the presence of ground fault in the negative voltage wire L− is determined.

Then, in the "neutral wire phase interruption detection", if the potentials satisfy the relationship of V1=V2=V5, the absence of abnormity is determined. If the potentials satisfy the relationship of V1=V2≠V5, the presence of neutral wire phase interruption is determined.

In addition, needless to say, the above determination condition is set in consideration of differences between the resistance values of the resistors R1 to R7.

Although the present invention has been described with reference to certain preferred embodiments, numerous modifications and variations can be made by those skilled in the art without departing from the true spirit and scope of this invention, namely claims.

The invention claimed is:

1. An electricity distribution system, comprising:
an AC feed line of a single phase three wire system for supplying an AC power to first electrical devices;
a DC feed line of a three wire system for supplying a DC power to second electrical devices; and an AC-DC converter configured to convert the AC power inputted from said AC feed line into the DC power outputted to said DC feed line,
wherein said AC-DC converter comprises an electrical circuit commonly connecting one of three wires of said DC feed line and a neutral wire of said AC feed line, and
wherein said AC-DC converter is configured to apply a DC voltage to each of positive and negative voltage wires, said positive voltage wire connected to a positive electrical potential to an electrical potential of said neutral wire, said negative voltage wire connected to a negative electrical potential to the electrical potential of said neutral wire further comprising a leak detector connected to said DC feed line,
wherein said leak detector further comprises:
a series circuit of first and second resistors, both ends of said series circuit of first and second resistors being connected to said positive voltage wire and said negative voltage wire through first and second switches, respectively;
a series circuit of third and fourth resistors, one end of said series circuit of third and fourth resistors being connected to said positive voltage wire through a third switch another end of said series circuit of third and fourth resistors being connected to said negative voltage wire;
a series circuit of fifth and sixth resistors, one end of said series circuit of fifth and sixth resistors being connected to said positive voltage wire other end of said series circuit of fifth and sixth resistors being connected to said negative voltage wire through a fourth switch;
a seventh resistor, one end of said seventh resistor being connected to a connecting point of said first and second resistors;
a first diode, a cathode of said first diode being connected to a connecting point of said third and fourth resistors, an anode of said first diode being connected to an other end of said seventh resistor;
a second diode, an anode of said second diode being connected to a connecting point of said fifth and sixth resistors, a cathode of said second diode being connected to the other end of said seventh resistor; and
a detection control circuit configured to control each switch and to determine the presence or absence of an electrical leak based on electrical potential relationships between a first detection point, a second detection point, a third detection point and a fourth detection point and to interrupt said DC feed line upon detection of the electrical leak, said first detection point being a connecting point of said first and second resistors, said second detection point being a connecting point of said first and second diodes, said third detection point being a connecting point of said third and fourth resistors, said fourth detection point being a connecting point of said fifth and sixth resistors,
wherein resistance values of said first and second resistors are set to be equal to each other,
wherein resistance values of said third and sixth resistors are set to be less than resistance values of said first and second resistors, and wherein resistance values of said fourth and fifth resistors are set to be more than resistance values of said first and second resistors.

2. The electricity distribution system as claimed in claim 1, wherein said first electrical devices receiving the AC power from said AC feed line and said second electrical devices receiving the DC power from said DC feed line are commonly connected to ground.

3. The electricity distribution system as claimed in claim 1, further comprising a fifth switch for selecting either one of a first state where said first detection point is connected to ground, and a second state where said first detection point is not connected to ground,
wherein said detection control circuit is configured to detect an electrical leak of said DC feed line when said fifth switch selects said first state, and
wherein said detection control circuit is configured to detect the presence of neutral wire phase interruption by means of comparing an electrical potential of said first detection point with an electrical potential of said neutral wire when said fifth switch selects said second state.

4. The electricity distribution system as claimed in claim 1, wherein at least one of said first electrical devices comprises a rectification circuit and a switching power circuit, and wherein said AC-DC converter is configured so that absolute values of voltages applied to said positive and negative voltage wires are set to be equal to each other, and to be within a range of a voltage being able to be used as an input voltage for said switching power circuit.

* * * * *